United States Patent
Grimes et al.

(10) Patent No.: US 11,313,092 B2
(45) Date of Patent: Apr. 26, 2022

(54) METERING GATE FOR DUAL AUGER SPREADER

(71) Applicant: SWENSON SPREADER, LLC, Lindenwood, IL (US)

(72) Inventors: Jason K. Grimes, Davis Junction, IL (US); Christopher Andrew Williams Norkus, Creston, IL (US)

(73) Assignee: SWENSON SPREADER, LLC, Lindenwood, IL (US)

( * ) Notice: Subject to any disclaimer, the term of this patent is extended or adjusted under 35 U.S.C. 154(b) by 319 days.

(21) Appl. No.: 16/521,476

(22) Filed: Jul. 24, 2019

(65) Prior Publication Data
US 2020/0173125 A1    Jun. 4, 2020

Related U.S. Application Data

(60) Provisional application No. 62/773,463, filed on Nov. 30, 2018.

(51) Int. Cl.
*E01C 19/20* (2006.01)
*G01F 13/00* (2006.01)
*E01H 10/00* (2006.01)

(52) U.S. Cl.
CPC ......... *E01H 10/007* (2013.01); *G01F 13/005* (2013.01); *E01C 2019/207* (2013.01); *E01C 2019/208* (2013.01)

(58) Field of Classification Search
CPC .. B60P 1/40; B60P 1/42; E01H 10/007; E01C 2019/209; E01C 2019/207
See application file for complete search history.

(56) References Cited

U.S. PATENT DOCUMENTS

| | | | | | |
|---|---|---|---|---|---|
| 3,322,429 | A | * | 5/1967 | Cervelli | B60P 1/42 239/670 |
| 3,768,737 | A | * | 10/1973 | Tobias | A01C 17/003 239/666 |
| 3,799,405 | A | * | 3/1974 | Wallace | B65G 65/46 222/238 |
| 4,234,109 | A | * | 11/1980 | Goodhart | A01C 15/006 222/609 |
| 4,575,010 | A | * | 3/1986 | Zimmerman | E01H 10/007 239/130 |
| 4,850,515 | A | * | 7/1989 | Cleland | B67D 1/0004 222/161 |
| 5,772,389 | A | * | 6/1998 | Feller | B60P 1/16 239/657 |
| 5,797,480 | A | * | 8/1998 | Gaddis | B60P 1/40 198/672 |
| 5,802,994 | A | * | 9/1998 | Kinkead | A01C 7/008 111/11 |
| 5,823,734 | A | * | 10/1998 | Hagemeyer | B60P 1/26 414/519 |

(Continued)

*Primary Examiner* — Joseph A Greenlund
(74) *Attorney, Agent, or Firm* — Myers Wolin, LLC (57) ABSTRACT

A spreader assembly may include a hopper, a pair of augers positioned in a dual auger arrangement and a metering gate assembly including a gate and a biasing force generator. The gate may have a general M-shape with an inner extension and may be positioned generally above the augers with the inner extension extending between the augers. The biasing force generator may be operable to apply a biasing force to the gate causing the gate to operate as a metering gate.

18 Claims, 12 Drawing Sheets

(56) References Cited

U.S. PATENT DOCUMENTS

| | | | | |
|---|---|---|---|---|
| 6,220,532 | B1* | 4/2001 | Manon | A01C 15/18 |
| | | | | 239/672 |
| 6,354,786 | B1* | 3/2002 | Feller | B60P 1/16 |
| | | | | 239/657 |
| 7,857,120 | B1* | 12/2010 | Perring | B65G 33/24 |
| | | | | 198/671 |
| 7,980,484 | B1* | 7/2011 | Podoll | E01C 19/203 |
| | | | | 239/4 |
| 10,407,254 | B2* | 9/2019 | Kiner | B65G 47/82 |
| 2005/0042064 | A1* | 2/2005 | Kulbeth | B65G 33/10 |
| | | | | 414/319 |
| 2005/0189444 | A1* | 9/2005 | Kost | E01C 19/203 |
| | | | | 239/661 |
| 2017/0107680 | A1* | 4/2017 | Gamble, II | B65G 33/10 |
| 2020/0173125 | A1* | 6/2020 | Grimes | E01H 10/007 |

* cited by examiner

METERING GATE FOR DUAL AUGER SPREADER

CROSS-REFERENCE TO RELATED APPLICATION

This application claims priority to U.S. Provisional Patent Application No. 62/773,463, filed Nov. 30, 2018, the entirety of which is fully incorporated by reference herein.

I. BACKGROUND

A. Field of the Invention

This invention generally relates to apparatuses and methods for spreading salt, sand or the like, onto road surfaces.

B. Description of Related Art

Spreaders are known devices used to spread salt, sand, anti-icing fluids or other such materials onto to road surfaces to treat the road surfaces for snow and ice. One known type of spreader is a dual auger spreader. While dual auger spreaders generally work well for their intended purposes, they are known to have problems in controlling the flow of granular material. One known problem is that the granular material moves in a "free flow" manner and thus flows around the auger flutes in an uncontrolled manner.

What is needed is a metering gate assembly that may be used with a dual auger spreader enabling the flow of granular material to be precisely controlled.

II. SUMMARY

According to some embodiments of this invention, a gate is profiled to the shape of the dual augers. In one specific example, this profile is generally M-shaped with a curved section receiving the top portion of each auger, an outer extension on each end that extends on the outside of each auger and an inner extension that extends between the two augers.

According to some embodiments of this invention, a biasing force generator helps control the flow permitted by the gate. In one specific example, the biasing force generator may be adjustable giving the operator the option of adjusting the biasing force to compensate for variables.

According to some embodiments of this invention, a spreader assembly may include: a hopper designed to hold associated granular material and comprising an opening; a first auger comprising flites; a second auger comprising flites; and, a metering gate assembly including a gate and a biasing force generator. The first and second augers may be positioned in a dual auger arrangement where they are: substantially parallel to each other; generally at the same height; and, noncollinear. The first and second augers may be operable to move the associated granular material from within the hopper to outside the hopper through the hopper opening. The gate may have a general M-shape with an inner extension positioned between first and second curved sections and first and second outer extensions positioned outside of the first and second curved sections, respectively. The gate may be positioned generally above the first and second augers with: the first and second curved sections receiving the first and second augers, respectively; the inner extension extending between the first and second augers; and, the first and second outer extensions extending outside of the first and second augers, respectively. The biasing force generator may be operable to apply a biasing force to the gate causing the gate to operate as a metering gate that compresses the associated granular material into the auger flites.

According to some embodiments of this invention, the first auger may have a longitudinal axis, the gate may be pivotable with respect to the hopper and the gate may be positioned at an acute angle with respect to longitudinal axis.

According to some embodiments of this invention, the biasing force generator may have a first end pivotally attached to the gate and a second end pivotally attached to the hopper.

According to some embodiments of this invention, the biasing force generator may be one of: a mechanical spring within a housing; a pneumatic cylinder; and, a hydraulic cylinder.

According to some embodiments of this invention, the biasing force applied by the biasing force generator may be manually adjustable to compensate for condition variables.

According to some embodiments of this invention, the gate may be pivotable with respect to the hopper and the biasing force generator may apply the biasing force to the gate to cause the gate to pivot in a first direction. When the gate encounters an associated solid debris object, the biasing force generator may be compressed causing the gate to counter pivot in a second direction opposite the first direction. When the gate no longer contacts the associated debris object, the biasing force generator may return to applying the biasing force to the gate to cause the gate to pivot in the first direction.

According to some embodiments of this invention, the gate may include: a generally M-shaped top gate segment; a generally M-shaped bottom gate segment; and, a generally M-shaped blade positioned between the top and bottom gate segments. The blade may extend toward the first and second augers more than the top and bottom gate segments.

According to some embodiments of this invention, the blade may be formed of a flexible material.

According to some embodiments of this invention, a spreader assembly method may comprise the steps of: A) providing a hopper designed to hold associated granular material and comprising an opening; B) providing a first auger comprising flites; and, a second auger comprising flites; C) providing the first and second augers to be positioned in a dual auger arrangement where they are: substantially parallel to each other; generally at the same height; and, noncollinear; D) providing a metering gate assembly including a gate and a biasing force generator; E) providing the gate with a general M-shape with an inner extension positioned between first and second curved sections and first and second outer extensions positioned outside of the first and second curved sections, respectively; F) providing the gate to be positioned generally above the first and second augers with: the first and second curved sections receiving the first and second augers, respectively; the inner extension extending between the first and second augers; and, the first and second outer extensions extending outside of the first and second augers, respectively; and, G) providing the spreader assembly to be selectively operable to perform the steps of: (1) rotating the first and second augers to move the associated granular material from within the hopper to outside the hopper through the hopper opening; and, (2) applying a biasing force by the biasing force generator to the gate causing the gate to operate as a metering gate that compresses the associated granular material into the auger flites.

According to some embodiments of this invention, step G)(2) may comprise the step of: causing the gate to pivot in a first direction and step G) may further comprise the steps of: encountering an associated solid debris object with the gate; compressing the biasing force generator; causing the gate to counter pivot in a second direction opposite the first direction; ending the encounter with the associated debris object; and, returning the biasing force generator to applying the biasing force to the gate to cause the gate to pivot in the first direction.

Various benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
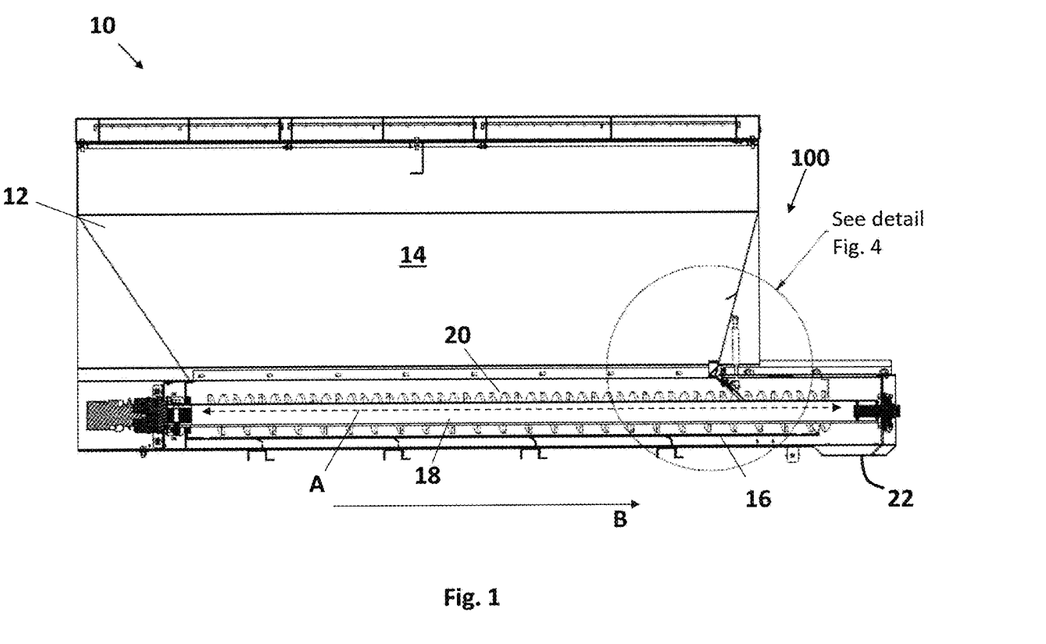
FIG. 1 is a side sectional view of spreader assembly.
Figure 2:
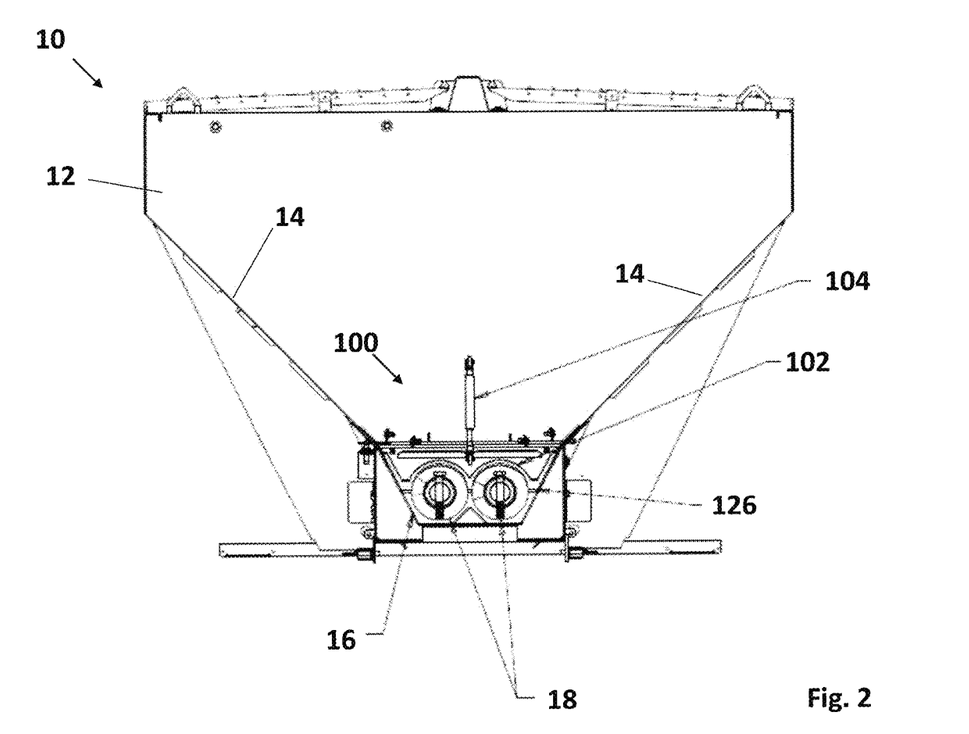
FIG. 2 is an end sectional view of the spreader assembly shown in FIG. 1.
Figure 3:
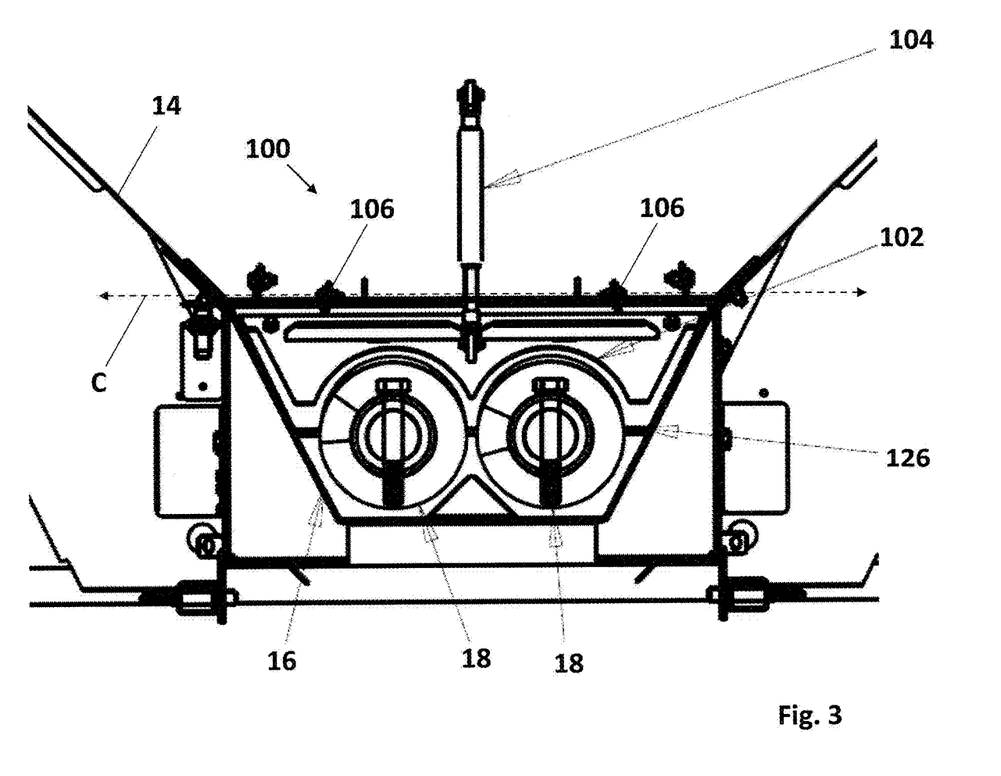
FIG. 3 is a close-up view of a portion of FIG. 2 showing the metering gate assembly and augers.
Figure 4:
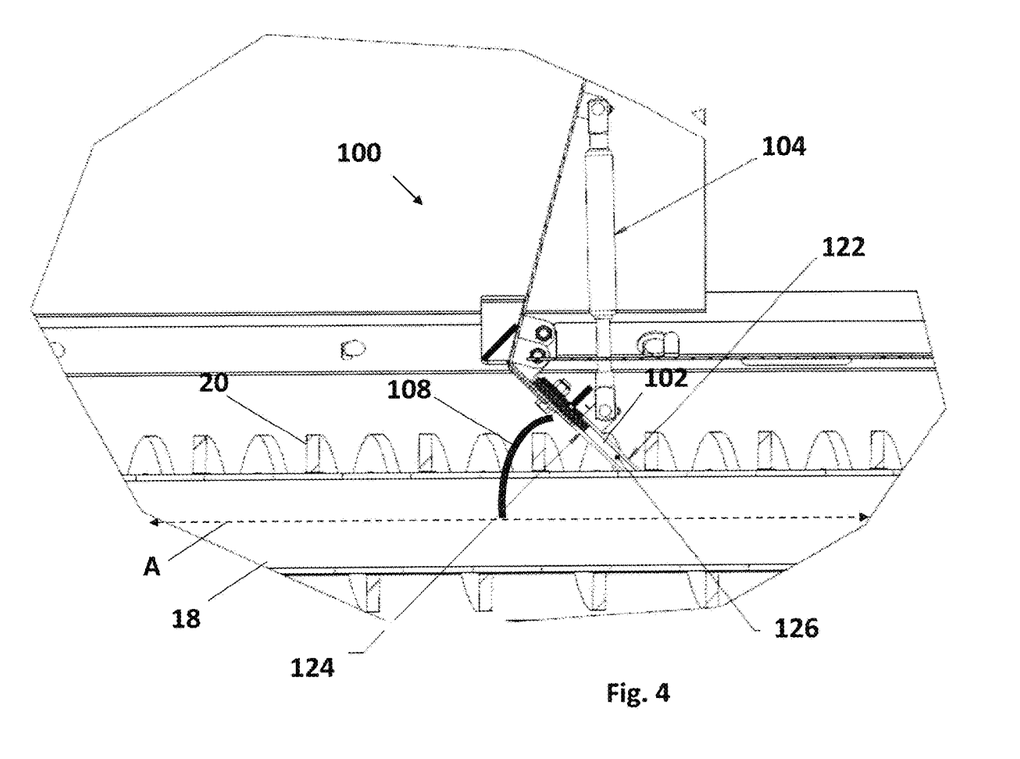
FIG. 4 is a detailed view of a portion of FIG. 1.

Referring now to the drawings wherein the showings are for purposes of illustrating embodiments of the invention only and not for purposes of limiting the same, and wherein like reference numerals are understood to refer to like components, FIGS. 1-3 show a spreader assembly 10 that may incorporate a metering gate assembly 100 according to some embodiments of this invention. The spreader assembly 10 may include a hopper 12, having side walls 14 and a floor 16, which may be used to hold salt, sand or other granular material. The spreader assembly may also have two augers 18, 18 positioned in a dual auger arrangement where the augers are substantially parallel to each other, generally at the same height but noncollinear. As is well known to those of skill in the art, each auger 18 may have flites 20 such that rotation of the augers 18, 18 moves the material within the hopper along the longitudinal axis A of the augers (in direction B as shown in FIG. 1) to an opening 22 where the material can be distributed onto a desired road surface.

Figure 7A:
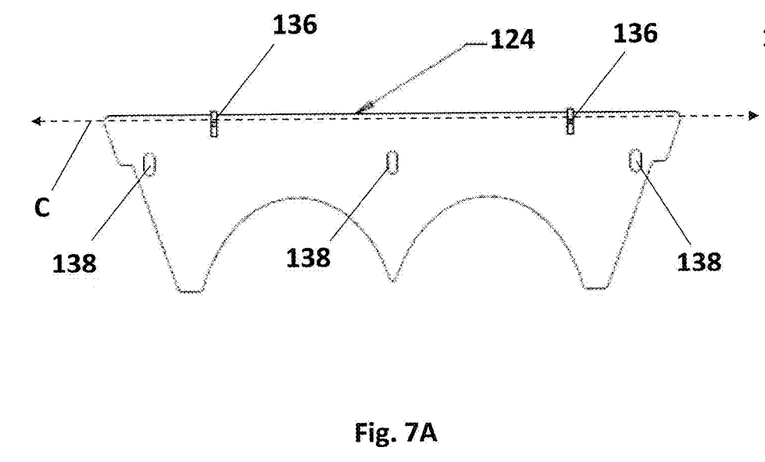
FIG. 7A is a side view of a bottom gate.
Figure 7B:
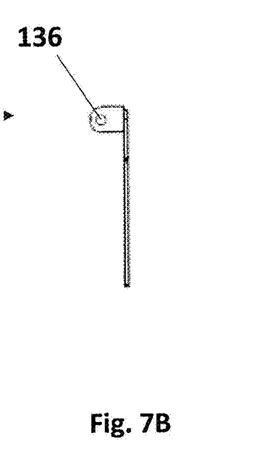
FIG. 7B is an end view of the bottom gate shown in FIG. 7A.
Figure 8A:
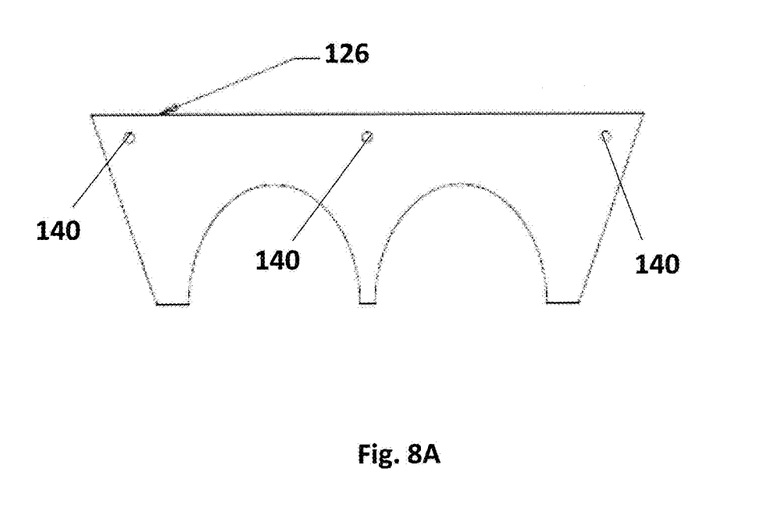
FIG. 8A is a side view of a blade.
Figure 8B:
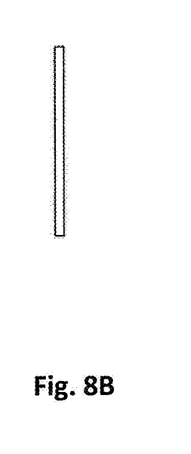
FIG. 8B is an end view of the blade shown in FIG. 8A.

With reference now to FIGS. 1-5, the metering gate assembly 100 may include a gate 102 and a biasing force generator 104 that applies a biasing force to the gate 102. The gate 102 may be positioned generally above the augers 18, 18 and may be pivotal with respect to the augers 18, 18 about pivot axis C (also shown in FIGS. 7A, 9 and 10). This pivotal connection can be made in any manner chosen with the sound judgment of a person of skill in the art. For the embodiment shown, the gate 102 pivots about a pair of hinges 106, 106 (also referenced in FIG. 11) that pivotally connect the gate 102 to the hopper 12. The gate 102 may be positioned at an acute angle 108 with respect to the longitudinal axis A of the augers 18, 18 as seen best in FIG. 4. While angle 108 may be approximately 45 degrees, as shown, any acute angle chosen with the sound judgment of a person of skill in the art may work with this invention.

Figure 5:
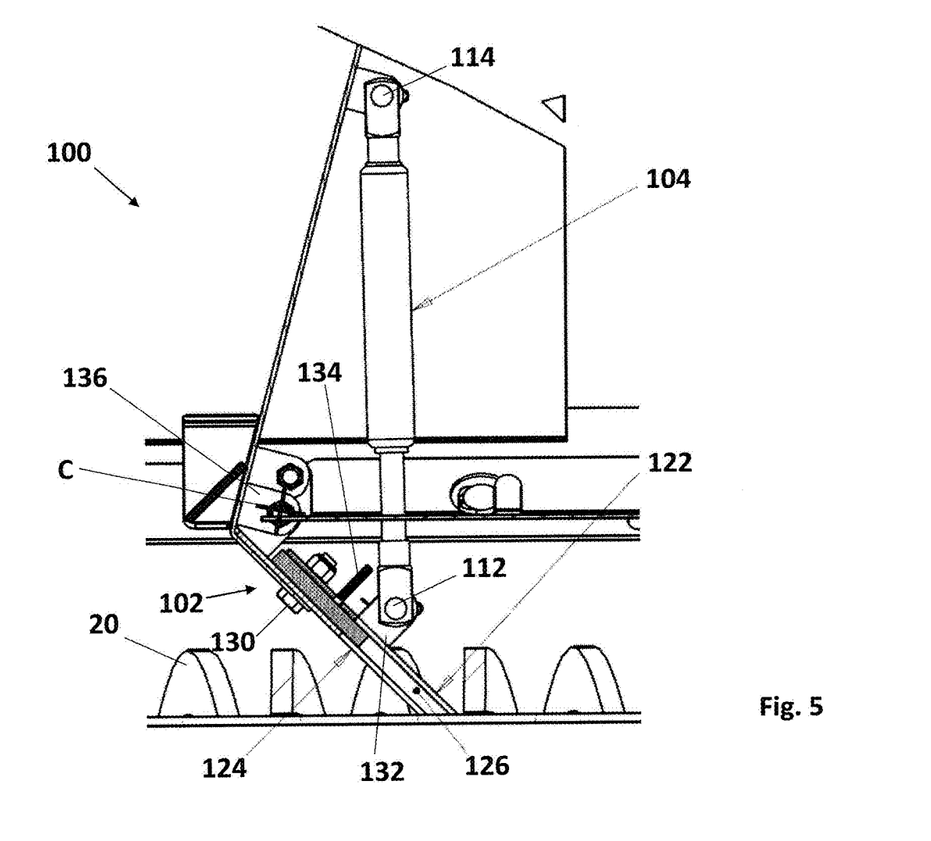
FIG. 5 is a close-up view of a portion of FIG. 4.
Figure 6A:
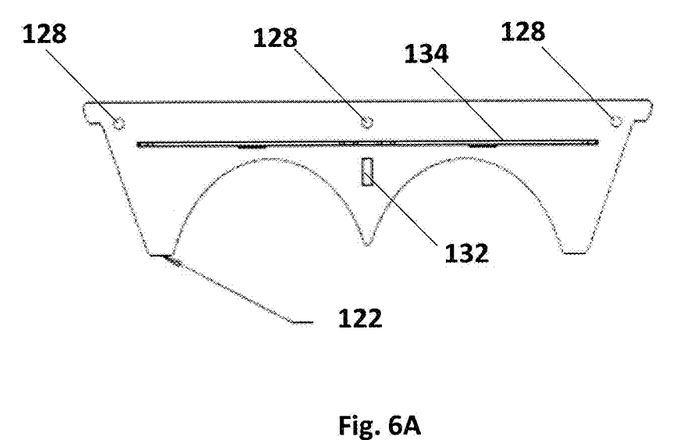
FIG. 6A is a side view of a top gate.
Figure 6B:
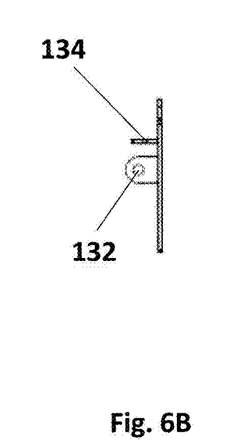
FIG. 6B is an end view of the top gate shown in FIG. 6A.
Figure 9:
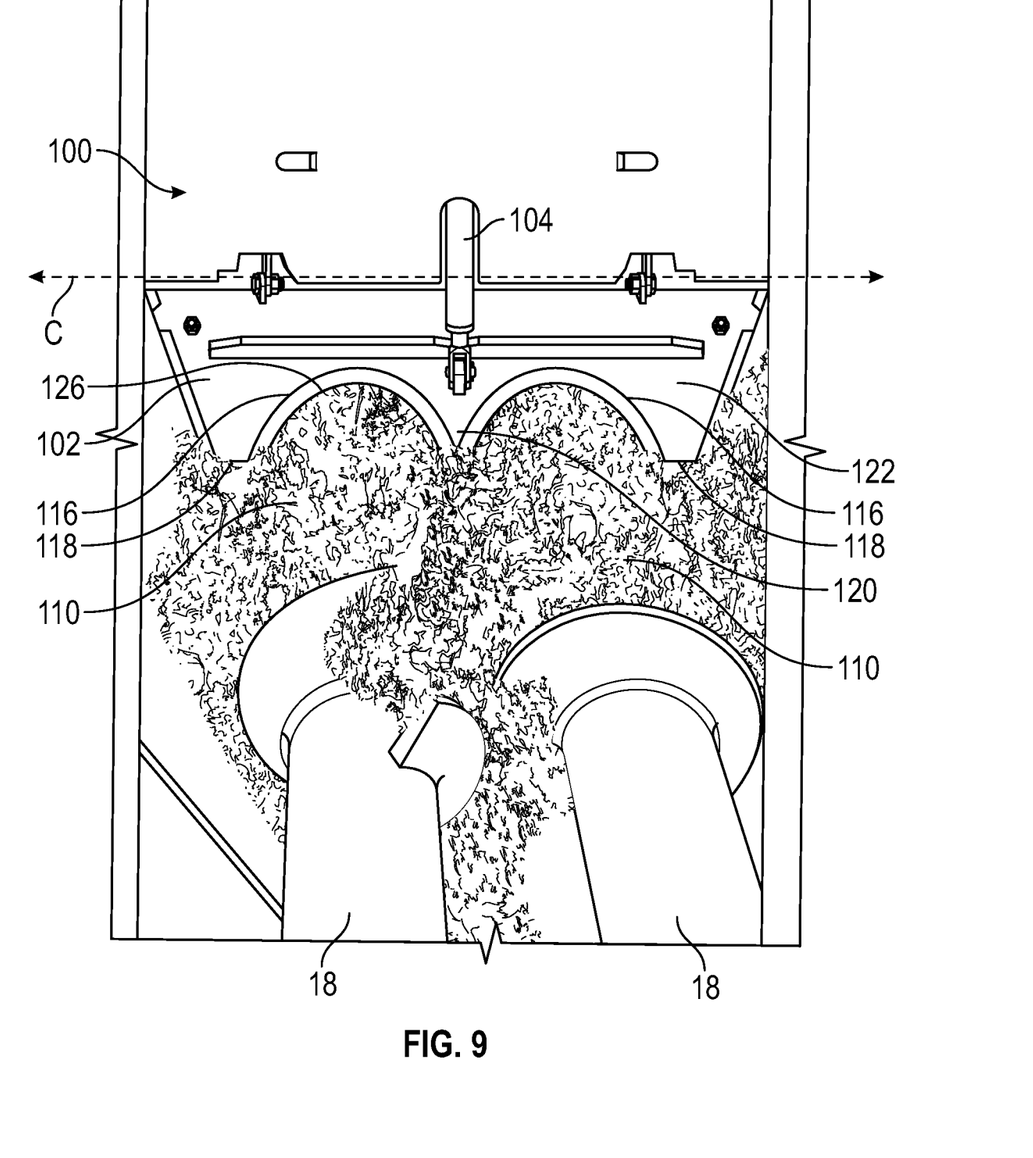
FIG. 9 is an end perspective view showing the gate operating as a metering gate to precisely control the flow of granular material through the dual auger spreader assembly.

With reference now to FIGS. 1-5 and 9, the biasing force generator 104 may apply a biasing force onto the gate 102, biasing it downward toward the augers 18, 18. In this way, as shown in FIG. 9, the gate 102 compresses the salt or other granular material 110 into the auger flutes 20, ensuring the augers 18, 18 remain full, even with a nearly empty hopper 12. The biasing force generator 104 can be of any type chosen with the sound judgment of a person of skill in the art. In one embodiment, shown, the biasing force generator 104 includes a mechanical spring within a housing. In other embodiments the biasing force generator 104 may use pneumatic or hydraulic cylinders. In order to provide the desired range of motion, one end of the biasing force generator 104 may be pivotally attached to the gate 102, as shown in FIG. 5, such as via pivotal connection 112 and the opposite end may be pivotally attached to the hopper 12 such as via pivotal connection 114. It is also contemplated that the biasing force generator 104 may be manually adjustable giving the operator the option of adjusting the biasing force to compensate for condition variables such as different spreading materials, different gates 102, different hoppers 12, different temperatures, etc. In some embodiments the force exerted by the biasing force generator 104 may be overcome (or compressed) providing advantages to be discussed further below.

With reference now to FIGS. 3-5 and 9, the gate 102 may be of any design chosen with the sound judgment of a person of skill in the art. In one embodiment, illustrated in FIG. 9, the gate 102 is profiled to the shape of the augers 18, 18. For the example shown, this profile is generally M-shaped with a curved section 116 receiving the top portion of each auger 18, an outer extension 118 on each end that extends on the outside of each auger 18, 18, and an inner extension 120 that extends between the two augers 18, 18. The extensions 118, 118, 120 may be generally V-shaped, as shown. It should be understood that the combination of the profiled gate 102 and the biasing force generator 104 allows the gate 102 to operate as a metering gate creating a precise flow of granular material out of the hopper 12 without free flow.

With reference now to FIGS. 3-9, in some embodiments the gate 102 may be formed of three major components; a top gate segment 122, a bottom gate segment 124 and a blade 126 positioned between the top and bottom gate segments 122, 124. The top gate segment 122 may have an upper portion with openings 128, three openings shown, used to receive fasteners 130 (referenced in FIG. 5) to mount the gate 102 to the hopper 12 and a lower portion that is generally M-shaped. The top gate segment 122 may also have a center tab 132 having an opening in order to connect the gate 102 to the biasing force generator 104 and a support rib 134 to provide structural rigidity to the gate 102. The bottom gate segment 124 may have an upper portion with tabs 136, 136 used to pivotally connect the gate 102 to the hopper 12, a midsection with openings 138, three openings shown, used to receive the previously noted fasteners 130 and a lower portion that is generally M-shaped. The blade 126 may have an upper portion with openings 140, three openings shown, used to receive the previously noted fasteners 130 and a lower portion that is generally M-shaped. Note that when the top gate segment 122, bottom gate segment 124 and blade 126 are assembled together to form the gate 102, the M-shaped portion of the blade 126 extend outward toward the augers more than the M-shaped portions of the top and bottom gate segments 122, 124. This can be seen, for example, in FIG. 9. Thus it is the blade 126 that creates the M-shaped profile with the augers 18, 18, explained above. In some embodiments the blade 126 is formed of a flexible material such as rubber.

With reference now to FIG. 9, the basic operation of the metering gate assembly 100 is as follows. The biasing force generator 104 applies a biasing force holding the gate 102 downward toward the augers 18, 18. The M-shaped portion of the blade 126 which is closest to the augers 18, 18 is profiled to match the shapes of the augers 18, 18. As a result, the gate 102 serves as a metering gate creating a precise flow of granular material 110. In some embodiments, to adjust the flow of the metering gate assembly 100, the force exerted by the biasing force generator 104 may be adjusted as desired by the operator.

Figure 10:
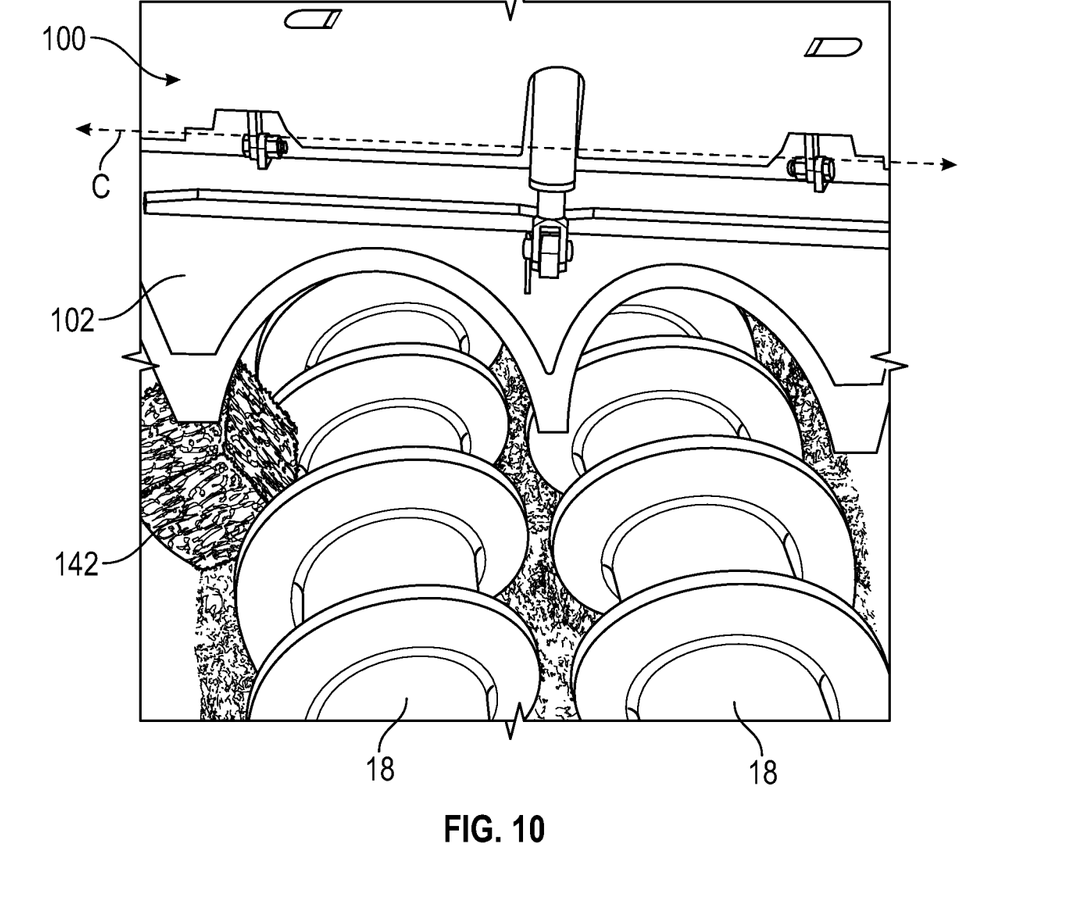
FIG. 10 is an end perspective view showing the gate beginning to encounter a debris object.
Figure 11:
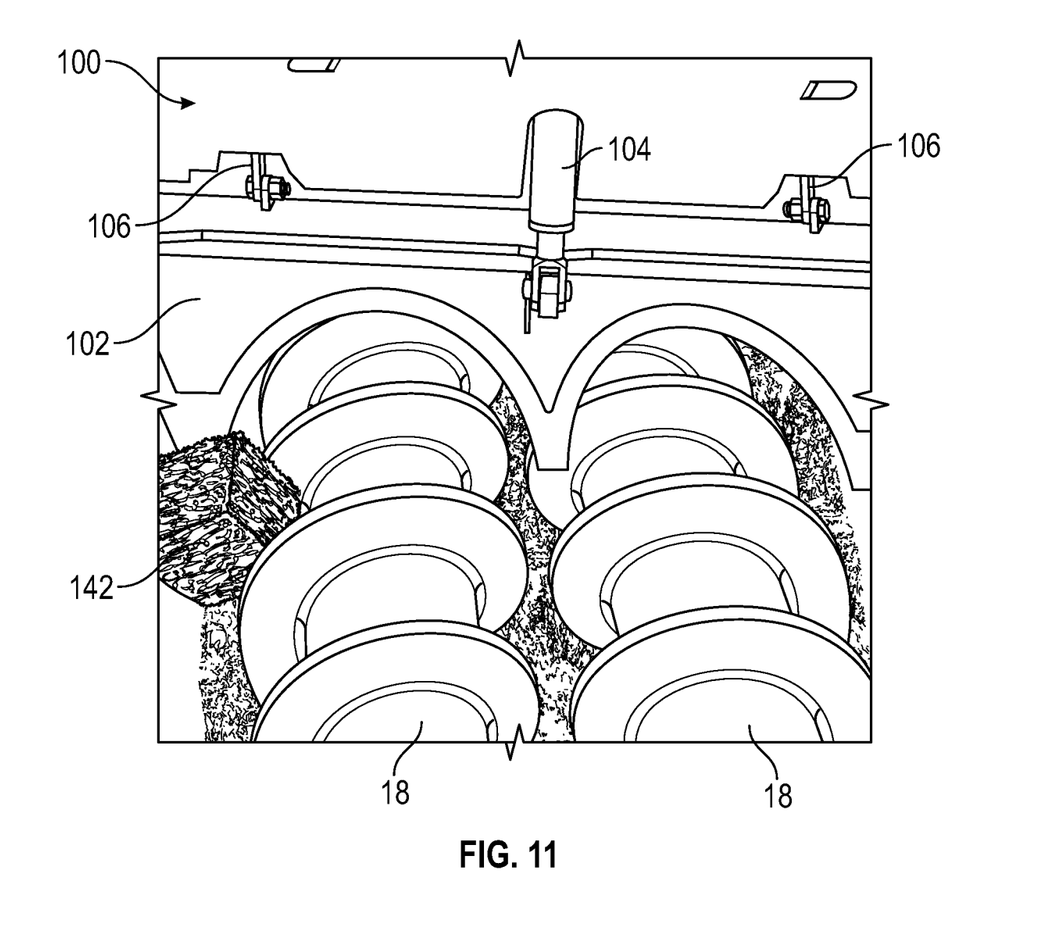
FIG. 11 is an end perspective view showing the gate counter pivoting to permit the debris object to pass without causing any damage.
Figure 12:
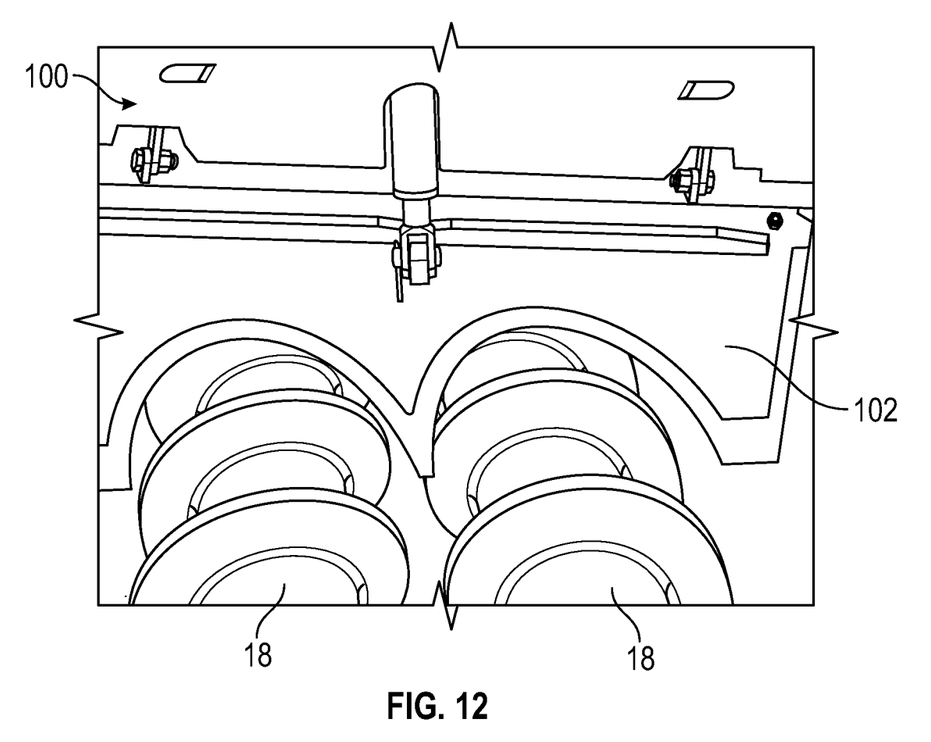
FIG. 12 is an end perspective view showing the gate returned to its normal operating position after the debris object passed through the gate.

With reference now to FIGS. 10-12, as noted above in some embodiments the force exerted by the biasing force generator 104 may be overcome (or compressed) allowing the gate 102 to counter pivot. This feature provides an advantage in case the granular load becomes too great or some solid debris is encountered. FIG. 10 shows an example with a relatively large solid debris object 142. When the debris object 142 is first encountered by the gate 102, as shown in FIG. 10, because the biasing force exerted by the biasing force generator 104 is not strong enough to break-up the debris object 142, it remains solid and continues being moved by the augers 18, 18 toward the downstream side of the gate 102. Instead of causing damage, however, the force exerted by the biasing force generator 104 is overcome (or compressed) as shown in FIG. 11. As a result, the gate 102 pivots upward (counter pivots) allowing the debris object 142 to pass through. Once the debris object 142 has passed, the biasing force of the biasing force generator 104 returns the gate 102 to its normal operating position as shown in FIG. 12.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

When the word "associated" is used in the claims, the intention is that the object so labeled is not positively claimed but rather describes an object with which the claimed object may be used.

We claim:

1. A spreader assembly comprising:
 a hopper designed to hold associated granular material and comprising an opening;
 a first auger comprising flites;
 a second auger comprising flites; and,
 a metering gate assembly including a gate and a biasing force generator;
 wherein:
 1) the first and second augers are positioned in a dual auger arrangement where they are: substantially parallel to each other; substantially the same height; and, noncollinear;
 2) the first and second augers are operable to move the associated granular material from within the hopper to outside the hopper through the opening;
 3) the gate has two curved sections with an inner extension positioned between first and second curved sections of the two curved sections and first and second outer extensions positioned outside of the first and second curved sections, respectively;
 4) a portion of the gate is positioned above the first and second augers with: the first and second curved sections receiving the first and second augers, respectively; the inner extension extending between the first and second augers; and, the first and second outer extensions extending outside of the first and second augers, respectively; and
 5) the biasing force generator is operable to apply a biasing force to the gate causing the gate to operate as a metering gate that compresses the associated granular material into the auger flites,
 wherein the first auger has a longitudinal axis, and wherein the associated granular material is transported from an upstream side of the auger on a first side of the gate to a downstream side of the auger on a second side of the gate along the longitudinal axis,
 wherein the gate is pivotable with respect to the hopper, and
 wherein the gate is positioned at an acute angle with respect to the longitudinal axis on the upstream side of the auger.

2. The spreader assembly of claim 1 wherein the biasing force generator has:
 a first end pivotally attached to the gate; and,
 a second end pivotally attached to the hopper.

3. The spreader assembly of claim 1 wherein the biasing force generator is one of:
 a mechanical spring within a housing;
 a pneumatic cylinder; and,
 a hydraulic cylinder.

4. The spreader assembly of claim 1 wherein the biasing force applied by the biasing force generator is manually adjustable to compensate for condition variables.

5. The spreader assembly of claim 1 wherein:
 the gate is pivotable with respect to the hopper;
 the biasing force generator applies the biasing force to the gate to cause the gate to pivot in a first direction;
 when the gate encounters an associated solid debris object, the biasing force generator is compressed causing the gate to counter pivot in a second direction opposite the first direction; and,
 when the gate no longer contacts the associated debris object, the biasing force generator returns to applying the biasing force to the gate to cause the gate to pivot in the first direction.

6. The spreader assembly of claim 1 wherein:
 the gate includes: a top gate segment with two curved sections; a bottom gate segment with two curved sections; and, a blade with two curved sections positioned between the top and bottom gate segments;
 the blade extends toward the first and second augers more than the top and bottom gate segments; and,
 the blade is formed of a flexible material.

7. A spreader assembly method comprising the steps of:
A) providing a hopper designed to hold associated granular material and comprising an opening;
B) providing a first auger comprising flites and a longitudinal axis; and, a second auger comprising flites;
C) providing the first and second augers to be positioned in a dual auger arrangement where they are: substantially parallel to each other; at substantially the same height; and, noncollinear;
D) providing a metering gate assembly including a gate and a biasing force generator;
E) providing the gate with two curved sections with an inner extension positioned between first and second curved sections of the two curved sections and first and second outer extensions positioned outside of the first and second curved sections, respectively;
F) providing a portion of the gate to be positioned above the first and second augers with: the first and second curved sections receiving the first and second augers, respectively; the inner extension extending between the first and second augers; and, the first and second outer extensions extending outside of the first and second augers, respectively; and,
G) providing the spreader assembly to be selectively operable to perform the steps of:
(1) rotating the first and second augers to move the associated granular material from an upstream side of the first auger within the hopper to a downstream side of the first auger outside the hopper through the opening; and
(2) applying a biasing force by the biasing force generator to the gate causing the gate to operate as a metering gate that compresses the associated granular material into the auger flites,
wherein the gate is pivotable with respect to the hopper and is positioned at an acute angle with respect to the longitudinal axis on the upstream side of the first auger.

8. The spreader assembly method of claim 7 further comprising the step of:
providing the biasing force generator with a first end pivotally attached to the gate and a second end pivotally attached to the hopper.

9. The spreader assembly method of claim 7 further comprising the step of providing the biasing force generator to be one of:
a mechanical spring within a housing;
a pneumatic cylinder; and,
a hydraulic cylinder.

10. The spreader assembly method of claim 7 further comprising the step of:
providing the biasing force applied by the biasing force generator to be manually adjustable to compensate for condition variables.

11. The spreader assembly method of claim 7 wherein:
step G)(2) comprises the step of: causing the gate to pivot in a first direction;
step G) further comprises the steps of:
encountering an associated solid debris object with the gate;
compressing the biasing force generator;
causing the gate to counter pivot in a second direction opposite the first direction;
ending the encounter with the associated debris object; and,
returning the biasing force generator to applying the biasing force to the gate to cause the gate to pivot in the first direction.

12. The spreader assembly method of claim 7 further comprising the steps of:
providing the gate with: a top gate segment with two curved sections; a bottom gate segment with two curved sections; and, a blade with two curved sections positioned between the top and bottom gate segments;
extending the blade toward the first and second augers more than the top and bottom gate segments; and,
forming the blade of a flexible material.

13. A spreader assembly comprising:
a hopper designed to hold associated granular material and comprising an opening;
a first auger having a longitudinal axis and comprising flites;
a second auger comprising flites; and,
a metering gate assembly including a gate pivotable with respect to the hopper and a biasing force generator having a first end pivotally attached to the gate; and, a second end pivotally attached to the hopper;
wherein:
1) the first and second augers are positioned in a dual auger arrangement where they are: substantially parallel to each other; at substantially the same height; and, noncollinear;
2) the first and second augers are operable to move the associated granular material from an upstream side of the first auger within the hopper to a downstream side of the first auger outside the hopper through the opening;
3) the gate has two curved sections with an inner extension positioned between first and second curved sections of the two curved sections and first and second outer extensions positioned outside of the first and second curved sections, respectively;
4) a portion of the gate is positioned above the first and second augers at an acute angle with respect to longitudinal axis on the upstream side of the first auger with: the first and second curved sections receiving the first and second augers, respectively; the inner extension extending between the first and second augers; and, the first and second outer extensions extending outside of the first and second augers, respectively;
5) the biasing force generator is operable to apply a biasing force to the gate causing the gate to operate as a metering gate that compresses the associated granular material into the auger flites.

14. The spreader assembly of claim 13 wherein:
the biasing force generator applies the biasing force to the gate to cause the gate to pivot in a first direction;
when the gate encounters an associated solid debris object, the biasing force generator is compressed causing the gate to counter pivot in a second direction opposite the first direction; and,
when the gate no longer contacts the associated debris object, the biasing force generator returns to applying the biasing force to the gate to cause the gate to pivot in the first direction.

15. The spreader assembly of claim 14 wherein:
the biasing force applied by the biasing force generator is manually adjustable to compensate for condition variables.

16. The spreader assembly of claim 15 wherein:
the gate includes: a top gate segment with two curved sections; a bottom gate segment with two curved sections; and, blade with two curved sections positioned between the top and bottom gate segments; and, the blade extends toward the first and second augers more than the top and bottom gate segments.

17. The spreader assembly of claim 16 wherein:
the blade is formed of a flexible material.

18. The spreader assembly of claim 17 wherein the biasing force generator is one of:
a mechanical spring within a housing;
a pneumatic cylinder; and,
a hydraulic cylinder.

* * * * *